United States Patent
St. Pierre et al.

(10) Patent No.: US 10,534,629 B1
(45) Date of Patent: Jan. 14, 2020

(54) VIRTUAL DATA MANAGEMENT SERVICES

(71) Applicant: EMC IP Holding Company LLC, Hopkinton, MA (US)

(72) Inventors: Edgar St. Pierre, Venice, FL (US); David Frattura, New York, NY (US); Iain Balmer, Glasgow (GB); Victor Da Costa de Oliveira, La Garenne Colombes (FR)

(73) Assignee: EMC IP Holding Company LLC, Hopkinton, MA (US)

( * ) Notice: Subject to any disclaimer, the term of this patent is extended or adjusted under 35 U.S.C. 154(b) by 134 days.

(21) Appl. No.: 15/798,751

(22) Filed: Oct. 31, 2017

(51) Int. Cl.
*G06F 9/50* (2006.01)
*G06F 9/455* (2018.01)

(52) U.S. Cl.
CPC ........ *G06F 9/45558* (2013.01); *G06F 9/5055* (2013.01); *G06F 2009/4557* (2013.01); *G06F 2009/45562* (2013.01); *G06F 2009/45595* (2013.01)

(58) Field of Classification Search
CPC ..... H04L 43/0817; H04L 41/12; H04L 43/08; H04L 47/781; G06F 2009/45591; G06F 9/45558
USPC .............................................. 709/226; 718/1
See application file for complete search history.

(56) References Cited

U.S. PATENT DOCUMENTS

| | | | | |
|---|---|---|---|---|
| 2015/0288768 A1* | 10/2015 | Goyal | .................... | G06F 9/455 709/228 |
| 2016/0380832 A1* | 12/2016 | Purushotham | .......... | H04L 41/12 709/226 |
| 2017/0005878 A1* | 1/2017 | Strandzhev | ............. | H04L 67/10 |
| 2017/0031955 A1* | 2/2017 | Kenchammana-Hosekote | ........... | H04L 67/142 |
| 2017/0199910 A1* | 7/2017 | Konik | ............... | G06F 16/24542 |
| 2017/0286302 A1* | 10/2017 | Roy | .................... | G06F 12/0831 |

OTHER PUBLICATIONS

Intel, "Intel Rack Scale Architecture Platform—Hardware Design Guide," https://www.intel.com/content/dam/www/public/us/en/documents/guides/rack-scale-hardware-guide.pdf, Document No. 332937-002, Revision 002, Aug. 2015, 20 pages.
Network Functions Virtualisation—Introductory White Paper, "Network Functions Virtualisation—An Introduction, Benefits, Enablers, Challenges & Call for Action," SDN and Open World Congress, https://portal.etsi.org/NFV/NFV_White_Paper.pdf, Oct. 22-24, 2012, 16 pages, No. 1.

(Continued)

*Primary Examiner* — John Q Chavis
(74) *Attorney, Agent, or Firm* — Ryan, Mason & Lewis, LLP

(57) ABSTRACT

Systems and methods are provided for implementing virtual data management services. For example, a method for providing virtual data management services in a computing system comprising a cluster of server nodes, includes receiving a request for a data management service, provisioning one or more server nodes within the cluster of server nodes to execute the requested data management service, configuring one or more instances of virtual data services from a plurality of available virtual data service templates to implement the requested data management service, and executing the configured instances of virtual data services on the one or more provisioned server nodes to perform the requested data management service.

20 Claims, 7 Drawing Sheets

(56) References Cited

OTHER PUBLICATIONS

"SCAP Standards", https://www.open-scap.org/features/standards/, 2016, 4 pages.
Oasis-Open.org, "Oasis Topology and Orchestration Specification for Cloud Applications (TOSCA) TC," https://www.oasis-open.org/committees/tc_home.php?wg_abbrev=tosca, 2017, 4 pages.

* cited by examiner

VIRTUAL DATA MANAGEMENT SERVICES

FIELD

The field relates generally to computing systems and, more particularly, to techniques for managing and implementing virtual services in cloud computing systems.

BACKGROUND

Various private/public entities such as service providers and enterprise organizations deploy large-scale distributed computing systems with data processing and storage functionality to support network applications and/or on-line services. For example, computing systems such as complex data centers and cloud computing platforms are typically implemented using a large number of computing resources, including, for example, a combination of physical and virtual compute, network and storage resources. As these computing systems must be continually scaled to meet increased user demand, a computing infrastructure which enables rapid and cost-effective scaling of computing resources should be implemented to meet such increased demand. One type of computing infrastructure that is utilized to implement a large-scale computing system comprises a software-defined architecture (such as a software-defined data center (SDDC)), which leverages logical infrastructure services that are abstracted from, as opposed to integrated with, underlying hardware. Composable infrastructure at multiple levels is the foundation for SDDCs through the virtualization of servers, storage, and network resources to provide a collection of virtual functions which deliver a virtual data center. SDDC technologies continue to evolve with the development of "Converged Infrastructure" (CI) and "Hyper-Converged Infrastructure" (HCI) platforms, which are leveraged to implement highly efficient and highly scalable SDDCs, at lower costs.

SUMMARY

Embodiments of the invention include systems and methods for providing virtual data management services. For example, one embodiment includes a method for providing virtual data management services in a computing system comprising a cluster of server nodes. The method comprises: receiving a request for a data management service; provisioning one or more server nodes within the cluster of server nodes to execute the requested data management service; configuring one or more instances of virtual data services from a plurality of available virtual data service templates to implement the requested data management service; and executing the configured instances of virtual data services on the one or more provisioned server nodes to perform the requested data management service.

Other embodiments will be described in the following detailed description, which is to be read in conjunction with the accompanying drawings.

DETAILED DESCRIPTION

Figure 1:
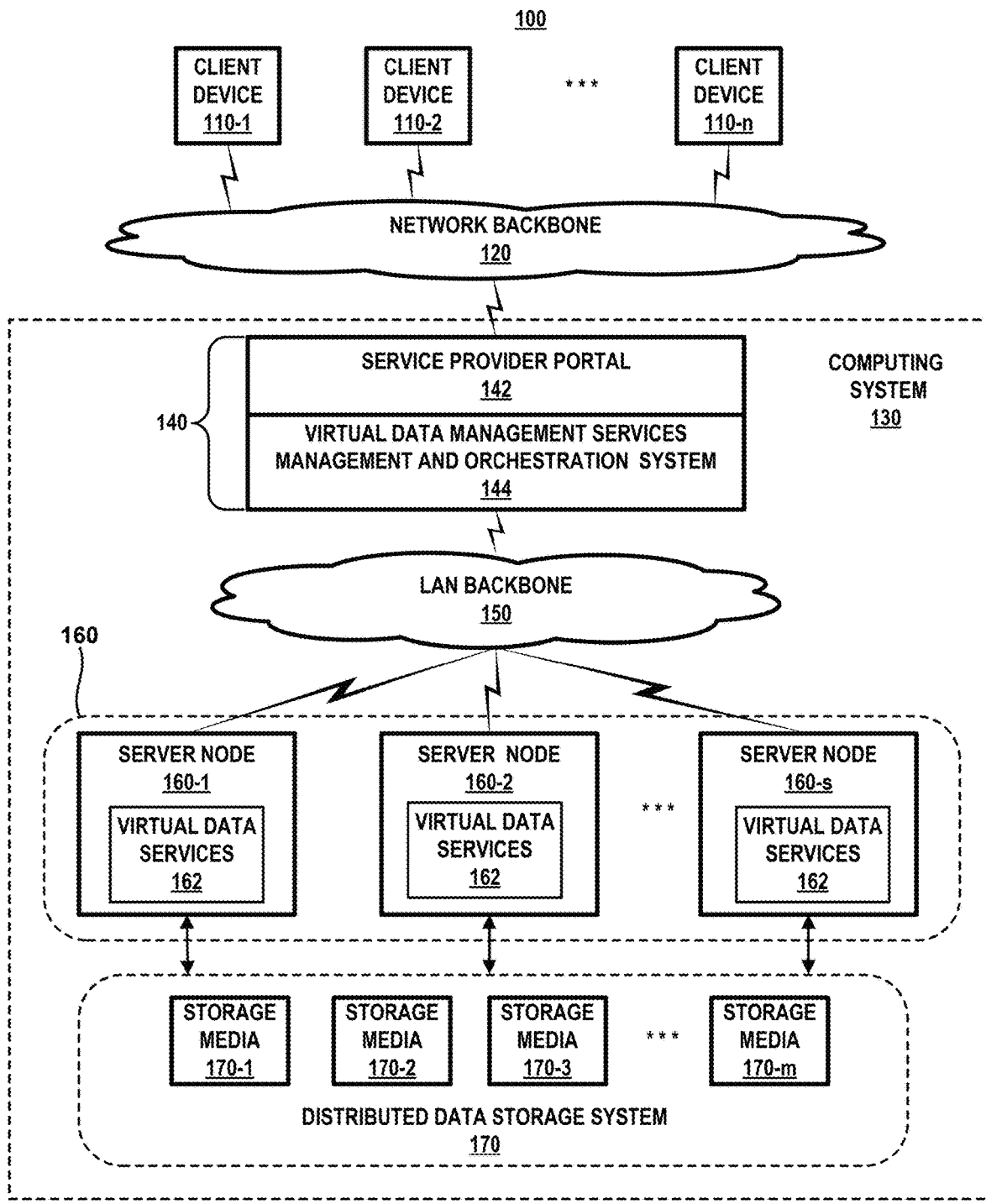
FIG. 1 is a high-level schematic illustration of a system which implements a virtualization platform to provide virtual data management services, according to an embodiment of the invention.

Illustrative embodiments will now be described in further detail with regard to systems and methods for implementing a virtualization platform to provide virtual data management services using composable virtual data service functions. Illustrative embodiments will be discussed in the context of computing systems, data storage systems, and associated servers, computers, memory devices, storage devices and other processing devices shown in the drawings, wherein the same or similar reference numbers as used throughout the drawings are meant to denote the same or similar features, elements, or structures. In this regard, a detailed explanation of the same or similar features, elements, or structures will not be repeated for each of the drawings.

It is to be understood that the term "computing system" as used herein with respect to various embodiments is intended to be broadly construed, so as to encompass, for example, private or public cloud computing systems, or parts thereof, as well as other types of systems comprising distributed virtual infrastructure and those not comprising virtual infrastructure. For example, the term "computing system" as used herein is intended to be broadly construed, so as to encompass any system comprising multiple networked processing devices such as a data center or any private or public cloud computing system or enterprise network. Moreover, the term "data storage system" as used herein is intended to be broadly construed, so as to encompass, for example, an application that executes on a computing system to implement any type of data storage system, or combination of data storage systems, including, but not limited to storage area network (SAN) systems, direct attached storage (DAS) systems, Hadoop Distributed File System (HDFS), as well as other types of block-level storage systems comprising clustered or distributed virtual and/or physical infrastructure. The terms "application," "program," and "application program" as used herein refer to any type of software application, including desktop applications, server applications, database applications, and mobile applications. The terms "application process" and "process" refer to an instance of an application or program that is being executed within a computing environment.

The term "virtual data service" as used herein refers to any type of virtual service that is configured to provide a data storage service or other types of virtual services that either (i) correspond to data storage services, (ii) are associated with data storage services, or (iii) are otherwise typically performed in conjunction with data storage services. For example, "virtual data services" include, but are not limited to, data storage services, data replication services, data mirroring services, data deduplication services, data protection services, data preservation services, etc., wherein one or more "virtual data services" can be configured to provide a "virtual data management service."

Furthermore, the term "control plane" as used herein refers to a set of control functions that are executed to control the flow of data along a data path in a data management system, for example, the "signaling" of the system. Moreover, the term "data plane" as used herein (also referred to as the "forwarding plane") refers to a processing path that data takes as the data flows through the data management system (e.g., a sequence of data processing functions performed on data that is received from a network entity, and stored in a data storage system, or a sequence of data processing functions performed on data that is accessed from the data storage system and transmitted to some network entity requesting the data).

FIG. 1 is a high-level schematic illustration of a system which implements a virtualization platform to provide virtual data management services, according to an embodiment of the invention. The system 100 comprises a plurality of client computing devices 110-1, 110-2, . . . , 110-n (collectively referred to as client computing devices 110), a network 120, and a computing system 130. The computing system 130 comprises a front-end system 140, a LAN (local area network) 150 (or a CE (Converged Ethernet) network), a cluster of server nodes 160-1, 160-2, . . . , 160-s (collectively referred to as server nodes 160), and a distributed data storage system 170. The front-end system 140 comprises a service provider portal 142 and a virtual data management services M&O (management and orchestration) system 144. The distributed data storage system 170 comprises plurality of storage media devices 170-1, 170-2, 170-3, . . . , 170-m (collectively referred to as storage media devices 170), which collectively provide a pool of storage resources that are shared by the server nodes 160. As discussed in further detail below, the server nodes 160 are configured to execute virtual data services 162 which are managed, configured and deployed under control of the virtual data management services M&O system 144 to provide virtual data management services.

In one embodiment of the invention, the LAN 150 comprises a plurality of network switches with Ethernet ports to implement a front-end customer facing network of the computing system 130, which enables client access to the servers 160. In addition, the LAN 150 comprises one or more switches (e.g., scale out switch fabric) that are configured to interconnect the server nodes 160 together with dedicated network links, thereby providing a switching fabric to enable peer-to-peer communication between the server nodes 160. In one embodiment, a Converged Ethernet (CE) network is implemented by running a user network and storage network on the LAN 150.

In some embodiments, the computing system 130 is implemented as part of a hosted service provider (xSP), wherein the xSP can be any type of business that delivers a combination of traditional IT functions such as infrastructure, applications (e.g., Software-as-a-Service (SaaS)) security, monitoring, storage, web development, website hosting, and email, over the Internet or other wide area networks (WANs). The server nodes 160 comprise application servers, web servers, storage servers, and other types of server nodes. The storage servers are configured to control and manage access to the storage media devices 170 of the distributed data storage system 170. The application/web servers are configured to host and manage one or more applications that are utilized by multiple, simultaneously connected users and/or entities. Depending on the applications/services provided by the computing system 130, the servers 160 are configured to, e.g., execute business logic, execute scripts and services to query databases, and perform other computing functions that are needed to host and deliver network applications, hosted applications, and various services to multiple end users, customers, tenants, service providers, and/or organizations. In one embodiment of the invention, the cluster of server nodes 160 resides in a single facility (e.g., data center facility of a private company). In another embodiment, the cluster of server nodes 160 resides in two or more data center facilities or is otherwise distributed over remote locations (e.g., distributed over a cloud network) of a given service provider, for example.

The client devices 110 may comprise, for example, desktop computers, laptop computers, PDAs (personal digital assistants), smart phones, electronic tablets, or other types of computing devices that enable end users, tenants, customers, and other entities to access the computing system 130 via the network 120. The network 120 may comprise, for example, a global computer network such as the Internet, a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the network 120 (in some embodiments) comprises combinations of multiple different types of communications networks each comprising network devices configured to communicate using an Internet Protocol (IP) (e.g., TCP/IP) or other related communication protocols. The network 120 comprises intermediate points (such as routers, switches, etc.) and other elements that form a network backbone to establish communication paths and enable communication between network endpoints.

In one embodiment, the computing system 130 comprises a software-defined architecture to implement a virtualization platform comprising the virtual data management services M&O system 144 and a collection of available virtual data services, which can be instantiated and deployed on the server nodes 160 to provide various types of virtual data management services to end users, tenants, customers, etc. The virtual data management services M&O system 144 provides a single, common platform to coordinate the deployment, configuration, and lifecycle management of a collection of available virtual data services to deliver a wide range of different types of virtual data management services to end users, tenants, customers, etc. The virtual data services 162 are instances of software that provide data service functions typically found in storage array systems. Various types of virtual data services, which can be utilized to support virtual data management services, will be discussed in further detail below with reference to FIG. 2.

Each virtual data service 162 that executes on a server node 160 comprises a software stack which comprises a full logical device with its own logical networking ports. The logical networking ports of virtual data services 162 are connected to a virtualized networking system within the host computing system 130 to communicate with other instances of virtual data services 162 executing on the server nodes 160, and/or to communicate over the network 120 to a customer environment. The virtual data services 162 can be instantiated to execute in virtual machines, or to execute as operating system containers, or to execute on bare metal, wherein the virtual data services 162 leverage the services of an underlying operating system including networking and storage data plane services. The virtual data services 162 are provisioned to interact with an external environment through network communications interfaces in the computing system 130 using various communications methods such as TCP/IP, Ethernet, Fiber Channel, Software Defined Networking, Virtual Extensible LAN (VXLAN), etc.

In some embodiments, a virtual data management service is configured using a single virtual data service instance which executes on one server node within the cluster of server nodes 160. In some embodiments, a virtual data management service is configured using multiple instances of different virtual data services executing on the same server node or across different server nodes, wherein the multiple instances of virtual data services are logically connected to each other to create an aggregate virtual data management service. In this instance, the virtual data management services M&O system 144 will provision a virtual data management service by combining two or more virtual data services into a service function chain in which the logical networking ports of two or more virtual data services instances are connected together to create a multi-function virtual data management service with a network connection to a target end customer environment.

In one embodiment, the distributed data storage system 170 is configured to provide a common abstraction for data storage upon which the virtual data services 162 are deployed to provide virtual data management services to end customers. The common abstraction for data storage serves to maximize storage resource utilization for the workloads of the virtual data services 162 and reduce the likelihood of creating "inaccessible islands of resources" by allowing access to the storage resources by any server node in the cluster of server nodes 160. In one embodiment, the distributed data storage system 170 comprises a shared block storage system. As is known in the art, a block storage system is a type of data storage where data is stored in volumes (also referred to as blocks). In a block-level storage system, raw volumes of storage are created by the server nodes 160 and each block can be controlled as an individual hard drive, for example.

The storage media devices 170-1, 170-2, 170-3, . . . , 170-m comprise persistent storage elements to store data, as well as control circuitry that is configured to control data access operations for storing or accessing data to and from one or more persistent storage elements of the storage media devices 170-1, 170-2, 170-3, . . . , 170-m. The persistent storage elements can be implemented using one or more different types of persistent storage devices such as HDDs (hard disk drives), flash storage devices (e.g., PCIe flash cards), SSD (solid state drive) devices, or other types and combinations of non-volatile memory. The storage media devices 170-1, 170-2, 170-3, . . . , 170-m are configured as a networked-based storage to provide a centralized repository for data that can be stored and accessed by the servers 160. The storage media devices 170-1, 170-2, . . . , 170-m collectively provide a pool of storage resources which can be utilized by the servers 160. In one embodiment, the storage media devices 170-1, 170-2, 170-3, . . . , 170-m can be configured in a storage area network (SAN) (e.g., virtual SAN) and coupled to the cluster of server nodes 160 via a dedicated switch fabric.

In one embodiment, the data storage system 170 can be implemented using a software-defined storage system such as ScaleIO™ which is commercially available from Dell EMC. For example, implementations utilizing ScaleIO™ can advantageously support hundreds or thousands of server nodes 160 with associated storage media devices, potentially providing one or more storage pools with a capacity on the order of a petabyte (PB). ScaleIO™ is a software-only solution that uses existing local storage media (e.g., HDD, SSD, or PCIe flash cards, either DAS or external) of a cluster of sever nodes and a LAN to create a virtual SAN that provides all the benefits of an external shared block storage system. Such an arrangement provides a single block storage layer across multiple servers 160 to allow agility and migration of applications and storage services. For example, a scale out file share service may be operating across multiple server nodes within the cluster of server nodes 160. The ability to utilize a block storage service that spans across all of some of the server nodes 160, and potentially many others, allows the file share service to efficiently move or scale across a rack, or a row, of servers, and not just within a single server.

Figure 2:
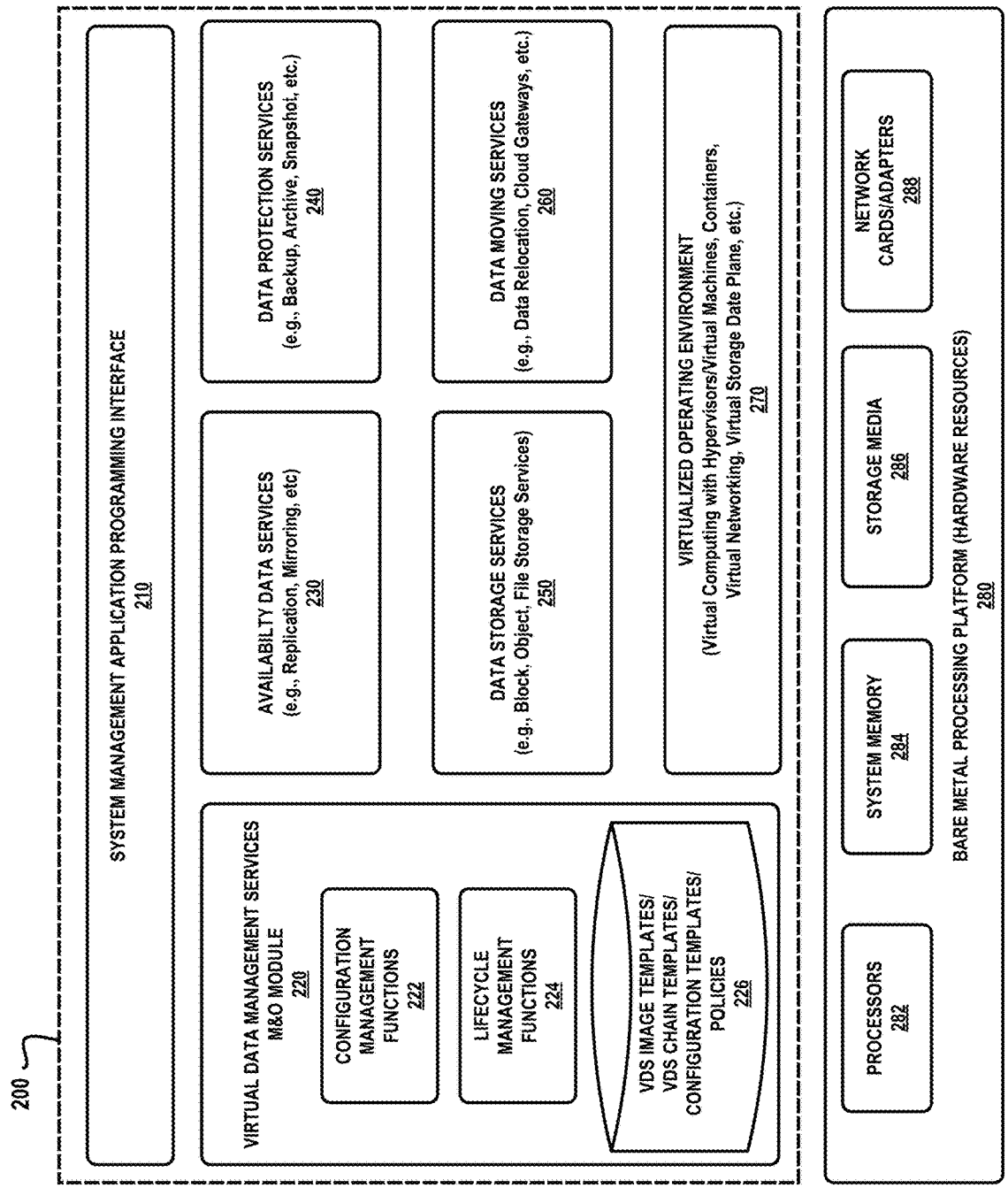
FIG. 2 is a high-level schematic illustration of a virtualization platform to provide virtual data management services using composable virtual data service functions, according to an embodiment of the invention.

FIG. 2 is a high-level schematic illustration of a virtualization platform 200 to provide virtual data management services using composable virtual data service functions, according to an embodiment of the invention. FIG. 2 illustrates details of a virtualization platform which can be implemented in the computing system 130 of FIG. 1 to support virtual data management services. The virtualization platform 200 comprises a plurality of software modules/layers which include a system management application programing interface (API) 210, a virtual data management services M&O module 220, a plurality of different virtual data services 230, 240, 250 and 260, and a virtualized operating environment 270. The virtualization platform 200 comprises software modules that execute on a bare metal processing platform 280, wherein the bare metal processing platform 280 comprises processors 282, system memory 284, data storage media 286, and networking devices 288 (e.g., network cards/adapters, etc.).

The processors 282 comprise one or more multicore processors that are configured to process program instructions and data to execute a native operating system (OS) and the virtualization system 200. In other embodiments, processors 282 may comprise one or more of a computer processor, a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, GPUs (graphics processing units), digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general purpose processor.

The system memory 284 comprises electronic storage media such as random access memory (RAM), read-only memory (ROM), or other types of memory, in any combination. For example, the system memory 284 may comprises a NAND Flash storage device, a SSD storage device, or other types of next generation non-volatile memory (NG-NVM) devices. The term "memory" or "system memory" as used herein refers to volatile and/or non-volatile memory which is utilized to store application program instructions that are read and processed by the processors 282 to execute a native operating system and one or more applications hosted by a server node, and to temporarily store data that is utilized and/or generated by the native OS and application programs running on the server node. In this regard, the system memory 284 and other memory or storage media as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The storage media 286 provide persistent data storage using one or more different types of persistent storage devices such as HDDs, flash storage devices, SSD devices, or other types and combinations of non-volatile storage media. The network cards/adapters 288 comprise network interface circuitry to support network communication using known networking architectures and protocols.

The system management API 210 comprises an API layer to support standard system components such as a customer portal system (e.g., portal 142, FIG. 1), an operations support system (OSS), and a business support system (BSS). The portal system comprises methods for communicating and connecting with client devices 110 (FIG. 1) and customer environments. The OSS implements system management functions such as service provisioning, delivery and fulfillment, network configuration and managing, and fault management. The BSS implements methods to support business operations towards customers. For an xSP, the system management API 210 may comprise an orchestration layer which embodies an xSP Service Catalog, an xSP workflow engine, and other automation functions to support OSS/BSS systems which include both the business functions, as well as other types of automated support functions that are typically utilized by an xSP to implement requisite system functionalities.

The virtual data management services M&O module 220 comprises configuration management (CM) functions 222 and lifecycle management (LM) functions 224, and a database 226 of virtual data service (VDS) image templates, VDS function chain templates, configuration templates, and associated policies, which are utilized to configure virtual data management services. The virtual data management services M&O module 220 provides a single, common management and orchestration platform to coordinate the configuration, instantiation, and deployment of the virtual data services 230, 240, 250, and 260. In addition, the virtual data management services M&O module 220 provides a control plane to virtually link a plurality of data services together to provide multi-function virtual data management services.

The plurality of virtual data services include availability data services 230, data protection services 240, data storage services 250, and data moving services 260. The availability data services 230 comprise virtual data services such as data replication, data mirroring, and other types of similar availability data services. The data protection services 240 comprise virtual data services such as data backup services, data archive services, snapshot services, and other types of similar data protection services. The data storage services 250 comprise virtual data storage services such as block storage services, object storage services, file storage services, and other types of data storage services. The data moving services 260 comprise virtual data services such as data relocation services, cloud gateway services, and other types of data moving services. The collection of available virtual data services supported by the virtualization platform 200 further comprises data encryption/decryption services, data deduplication services, data compression/decompression services, etc., and other types of data processing services that are typically implemented in connection with, or are otherwise associated with, the different virtual data services 230, 240, 250, and 260 shown in FIG. 2.

In the database 226, the VDS image templates comprise deployed software images (e.g., golden images) of virtual data services in non-instantiated form. The collection of VDS image templates include at least one image template for each virtual data service supported by the virtualization system 200. In one embodiment, each VDS image template comprises a "golden image" (or master image or base image), which is a basic template that defines the virtual data service. In particular, the VDS image templates are basic software deployments of the virtual data services, which have no specific configuration. In this instance, each (golden) VDS image template may comprise one or more configuration templates that can be used to configure the basic (golden) VDS image template for different target configurations. In other embodiments, a virtual data service may comprise one or more higher level VDS image templates, each of which representing a golden VDS image template with a custom or predefined configuration.

In addition, the VDS chain templates in the database 226 define default or custom sequences (chains) of VDS image templates, which can be configured and deployed to provide multi-function virtual data management services. The predefined policies in the database 226 specify what types of virtual data services or combinations of virtual data services should be used to support a virtual data management service requested by a given customer. For example, a customer may request to add a new user to a given environment. In response to the customer request, the virtual data management services M&O module 220 may determine from a policy associated with such request, that a multi-function data management service should be configured and deployed to satisfy the customer request. For example, to add a new user to a given environment, a multi-function virtual data management service may be configured and deployed, which comprises (i) a first virtual data service instance configured to add a new volume for the new user in a shared data storage system, (ii) a second virtual data service (backup data service) configured to create a backup image for the new volume, and (iii) a third virtual data service (replication service) configured to replicate the newly configured volume. In this regard, the policies within the database 226 may map customer requests for data management services to single VDS templates or to VDS chain templates.

In one embodiment, the virtual data services 230, 240, 250 and 260 provide a collection of virtual data services that are implemented in various commercially available data storage products, wherein virtual data service functions provided by current or future data storage products can be delivered as individual virtual data services. For example, the availability data services 230 may include virtual data service functions that are implemented in the commercially available data storage product VPLEX by Dell EMC. VPLEX is a virtual computer data storage product which implements a distributed "virtualization" layer within and across geographically disparate storage area networks (SANs) and data centers. VPLEX is essentially a storage virtualization appliance which resides between storage arrays and hosts and virtualizes the presentation of the storage arrays to the host, and includes virtual functions to support array-based storage replication across heterogeneous storage arrays. In addition, the availability data services 230 may include virtual data service functions that are implemented in the commercially available data storage product RecoverPoint by Dell EMC. Recoverpoint is a continuous data protection product which supports asynchronous and synchronous data replication of block-based storage.

In addition, the data protection services 240 may include virtual data service functions that are implemented in the commercially available data backup and recovery software Avamar Virtual Edition (AVE) by Dell EMC. AVE provides a software-only data protection solution which supports VMware, vSphere, and other virtualization platforms, provides guest and image-level backup and recovery, and which enables application-consistent recovery, uses variable-length deduplication, and uses AES-256 encryption to secure data. The data protection services 240 may include virtual data service functions that are implemented in the commercially available Dell EMC products such as Data Protection Advisor (DPA), Data Domain Virtual Edition (DDVE), and Enterprise Copy Data Management (eCDM).

Moreover, the data storage service 250 may include virtual data service functions that are implemented in the commercially available data storage products by Dell EMC such as IsilonSd, ScaleIO, VMAX, GeoNAS, Elastic Cloud Storage (ECS) for object storage, and UnityVE. The data moving services 260 may include virtual data service functions that are implemented in the commercially available data management products by Dell EMC such as Isilon CloudPools, CloudArray, Cloudboost, and Cloud Tiering Application (CTA).

The virtual data services M&O module 220 provides a common platform to provide consistency and composability to virtual data management services using a collection of available VDS templates (e.g., VDS image templates, VDS chain templates, configuration templates, etc.). Regardless of the delivery model, the service lifecycle management functions 224 provide a single HTTP-based management service, and API, that delivers services such as: (i) start, stop, heartbeat monitoring, and restart of VDS instances; (ii) policy- and affinity-based placement of VDS instances; (iii) automatic scaling of services via configurable policies that are based on service-specific workload and capacity metrics; (iv) patch/update services for VDS binaries; (v) live upgrades for VDS templates, and where feasible, minimal or no downtime of service delivery (e.g., controlling a service function chain allows maximum control using switchover instead of restart); (vi) rollback and recovery of failed patches and upgrades; and (vii) service vulnerability assessments for each virtual data service, to provide the ability to assure that the storage path has not been compromised by intrusion (e.g., Security Content Automation Protocol (SCAP) is a standard building block in this domain).

The service configuration management functions 222 enable automation in template creation. The virtualization platform 200 can be configured to initially deliver a number of standard VDS image templates, and then allow for the creation of new VDS image templates by the xSP based on the standard templates. The configuration management functions 222 include, for example: (i) providing default templates for available standalone services; (ii) providing default templates for service function chains, as well as providing dependencies for applying the service function chains, e.g., "ESX required" for a VDS that only runs on ESX, which would be important to know in a KVM environment. And it may or may not prevent its use in a Service Function Chain, e.g., RP4VM can only support ESX-based workloads, but IsilonSD could still provide a File Share for KVM-based workloads. In this regard, automation-enabling definition of dependencies is a key deliverable in the virtualization platform 200.

The configuration management functions 222 further include functions for (i) creating VDS and service function chain templates for deployment based on defined sizing characteristics (size, bandwidth, etc.); (ii) pre-validating service function chains to address dependencies (which is needed to allow xSP administrators to create only logical, validated, service templates on the fly); (iii) verifying configuration compliance on a periodic basis, to ensure that the active service deployment configuration is consistent with the expected/deployed configuration; and (iv) implementing service level compliance operations, where appropriate, to ensure that virtual data services such as virtual data storage and data protection services are meeting expected service level delivery, as per service catalog definitions for quality of service (QoS).

It is to be noted that the service lifecycle management functions 224 and the service configuration management functions 222 may be delivered as micro services that could be independently iterated upon over time. In one embodiment, the virtual data management services M&O module 220 utilizes an inventory management service to track and identify available resources in the environment. In addition, the virtual data management services M&O module 220 is configured with knowledge of domain-specific management environment APIs, e.g., how to deploy services via ESX API or OpenStack API or as Docker Containers in Kubernetes or Mesos. In this regard, adapters can be constructed on a per-domain basis for basic functionality of inventory queries, deployment, management, etc.

The virtual data services can be implemented as virtual machines, container-based micro-services, independently-configurable functions within a product portfolio, or otherwise be deployed as Unikernel-based services, or accelerator (Smart NIC/FPGA)-based services, etc. The virtualized operating environment 270 provides virtual resources (e.g., hypervisors, container engine layers, virtual networking resources, virtual storage data plane resources, etc.) which are utilized by the virtualization platform 200 to configure and deploy instances of virtual data services using virtual machines and operating system containers. More specifically, in one embodiment, one or more instances of virtual data services can be deployed to execute within virtual machines that are implemented using a hypervisor platform that executes on top of the bare metal processing platform 280. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the base metal processing platform 280, and emulates the CPUs, memory, hard disk, network and other hardware resources of a host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtual data services can be implemented to execute as operating system containers using container applications such as Docker containers or other types of Linux containers (LXCs). As is known in the art, in a container-based application framework, each application comprises a separate application and associated dependencies and other components to provide a complete file system, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. In yet another embodiment, containers may be used in combination with other virtualization infrastructure such as virtual machines implemented using a hypervisor, wherein Docker containers or other types of LXCs are configured to run on virtual machines in a multi-tenant environment.

In another embodiment, virtual data services can be configured, instantiated and deployed for execution as bare metal applications. In this embodiment, a virtual data service would include the software stack to implement the virtual data service functions, as well as an operating system (e.g., Windows) to execute the virtual data service. The operating system for the virtual data service may be included in the database 226 as a golden image in which case the golden image of the operating system would be configured and deployed one or more sever nodes, and then one or more VDS instances would be configured and deployed on top of the deployed operating system, for execution by the operating system.

Figure 3:
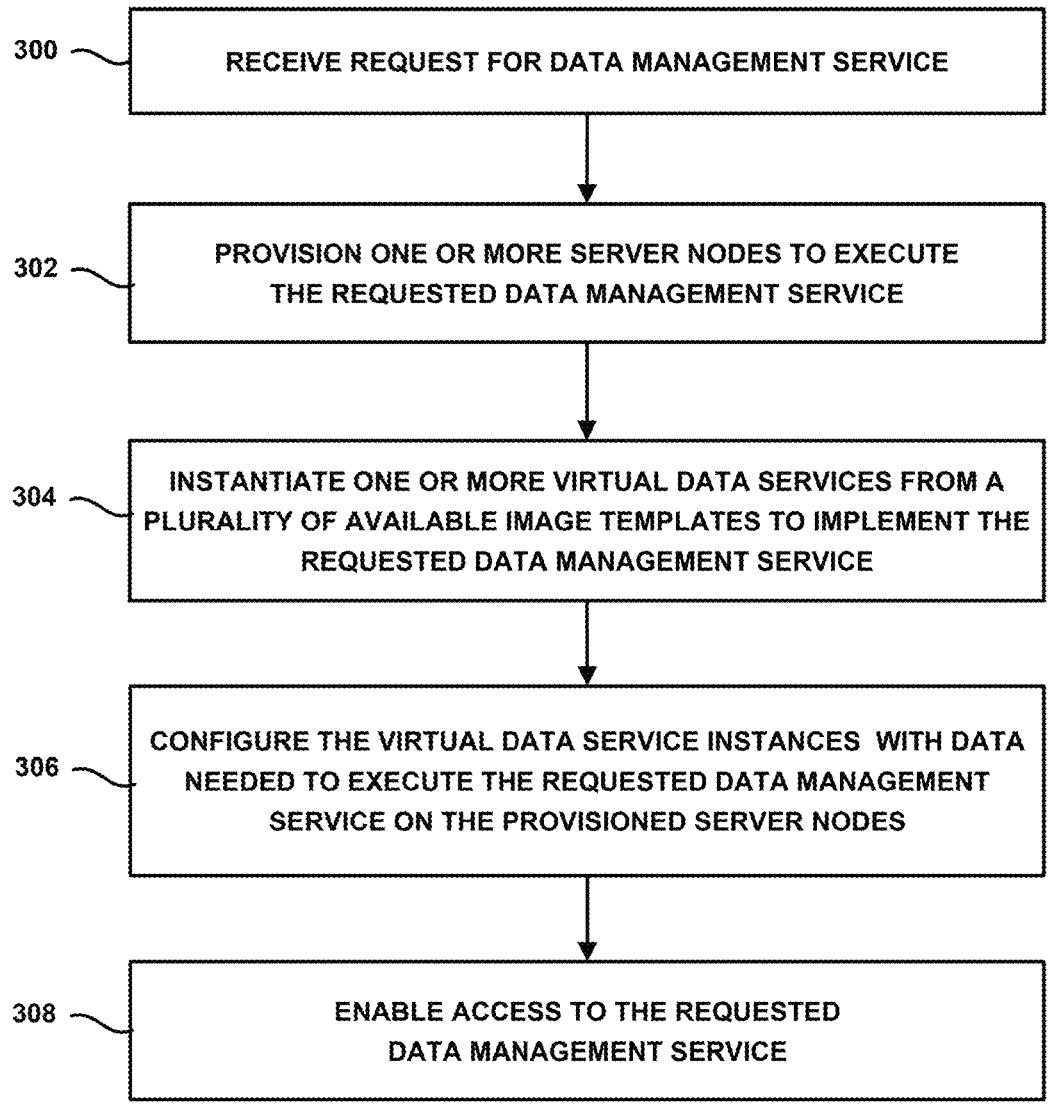
FIG. 3 is a flow diagram of a method to provide virtual data management services using composable virtual data service functions, according to an embodiment of the invention.

FIG. 3 is a flow diagram of a method to provide virtual data management services using composable virtual data service functions, according to an embodiment of the invention. For illustrative purposes, the flow diagram of FIG. 3 will be discussed in the context of the systems shown in FIGS. 1 and 2, wherein it is assumed that the method is implemented by a virtual data management services M&O module (e.g., element 144 of FIG. 1, element 220 of FIG. 2). In the example process flow, it is assumed that a tenant requests a data management service for a hosted application (e.g., software as a service (SaaS)) that executes on the computing system 130 (FIG. 1). The virtual data management services M&O module will receive and process the request for the data management service (block 300). The virtual data management services M&O module will provision one or more sever nodes to execute the requested data management service (block 302). The requested data management service is implemented by instantiating one or more virtual data services from a plurality of available image templates (block 304). As discussed above, such image templates can include VDS image templates, VDS chain templates, OS templates, configuration templates, and other types of image templates which are utilized for the target service. The virtual data services instances are then configured with data that is needed to execute the requested data management service on the provisioned server nodes (block 306). The virtual data management services M&O module delivers to the tenant credentials and access to the requested data storage service (block 308). In one example embodiment, blocks 302 and 304 are implemented using lifecycle management functions 224 of the virtual data management services M&O module 220, and block 306 is implemented using configuration management functions 222 of the virtual data management services M&O module 220.

The process flow of FIG. 3 will be explained by way of an example in which it is assumed that a tenant requests (in block 300) a scale out file service for a hosted application. In response to the request, the virtual data services M&O module (in blocks 302 and 304) may request the provisioning of three IsilonSD virtual machines (i.e., OneFS virtual machines) on three different ESXi hosts in a vSphere cluster of the tenant, with specific IP address requirements, and three OneFS virtual machines are instantiated by vSphere. As is known in the art, ESXi is an enterprise-class type-1 hypervisor for deploying and serving virtual computers. In addition, as is known in the art, Isilon OneFS includes a number of rackable Isilon nodes that run OneFS software which unifies a cluster of nodes into a single shared resource. The nodes are clustered together to provide scale-out file services that are resilient to node and drive failures. IsilonSD creates a OneFS virtual cluster through resources available on VMware ESXi hosts. The OneFS clusters are deployed as virtual machines and drives are hosted on data disks. The virtual data services M&O module (in block 306) will then configure the vOneFS instances based on, e.g., network and storage requirements.

Figure 4:
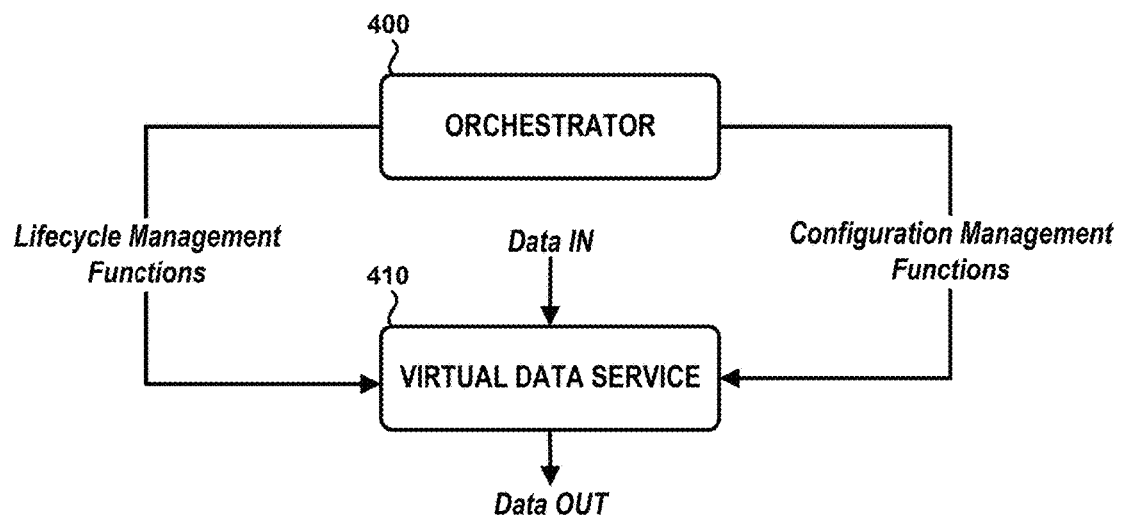
FIG. 4 schematically illustrates a method to manage and configure a virtual data management service using a single instance of a virtual data service function, according to an embodiment of the invention.

FIG. 4 schematically illustrates a method to manage and configure a virtual data management service using a single instance of a virtual data service function, according to an embodiment of the invention. In particular, FIG. 4 illustrates an orchestrator module 400 which instantiates and configures a single instance of a virtual data service 410 to implement a virtual data management service. In one embodiment, the orchestrator module 400 implements the functionalities of the virtual data services M&O module 220 as discussed above, (e.g., configuration management functions 222 and lifecycle management functions 224) to instantiate and configure the virtual data service 410. In another embodiment, the orchestrator module 400 integrates the virtual data services M&O module together with portal, OS and/or BSS systems to provide additional coordinated functionalities to assist with the deployment and instantiation of virtual data services.

As further shown in FIG. 4, the virtual data service 410 can be any type of data service that is injected into a data storage path to perform a function on the data stream. For example, the virtual data service 410 may include an encryption function wherein an input data stream (Data IN) is input to the virtual data service 410, the input data stream is encrypted based on policies asserted in the virtual data service 410, and the virtual data service 410 outputs an encrypted data stream (Data OUT). The virtual data service 410 can also be implemented to handle an input data storage data stream, wherein the virtual data service 410 comprises a virtual data management service which stores an output data stream on a storage media such as NVMe, flash, or a HDD.

Figure 5:
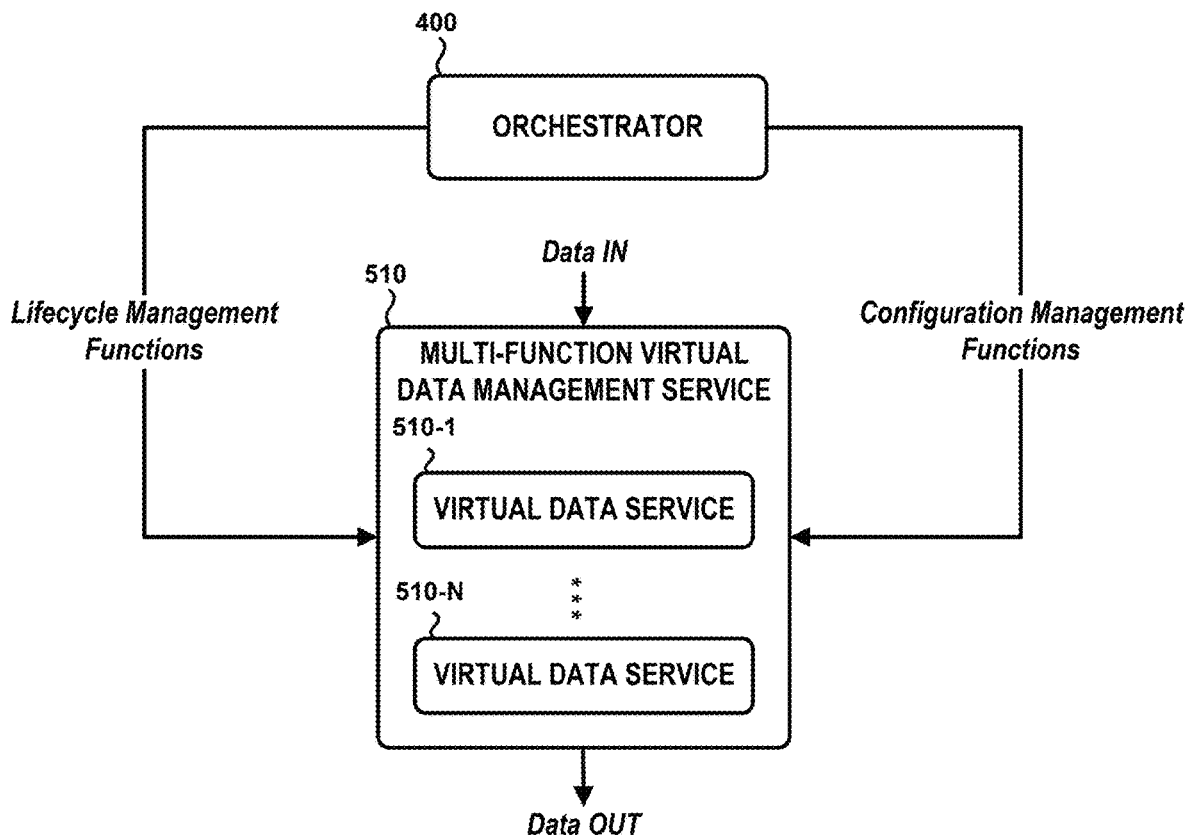
FIG. 5 schematically illustrates a method to manage and configure a multi-function virtual data management service by aggregating multiple instances of different virtual data service functions, according to an embodiment of the invention.

FIG. 5 schematically illustrates a method to manage and configure a multi-function virtual data management service by aggregating multiple instances of different virtual data service functions, according to an embodiment of the invention. In particular, FIG. 5 illustrates an exemplary embodiment in which the orchestrator module 400 instantiates and configures a multi-function virtual data management service 510 comprising multiple instances (N) of virtual data services 510-1, . . . , 510-N, that are sequentially chained together to perform a series of data service functions on an input data stream (Data IN) to generate an output data stream (Data OUT). For instance, the multi-function virtual data management service 510 may comprise a File Service which comprises a composed sequence of two virtual data services including a deduplication service to perform a data deduplication process on input data stream, and a block storage service to store the deduplicated data stream (Data OUT) in a block storage array.

Figure 6:
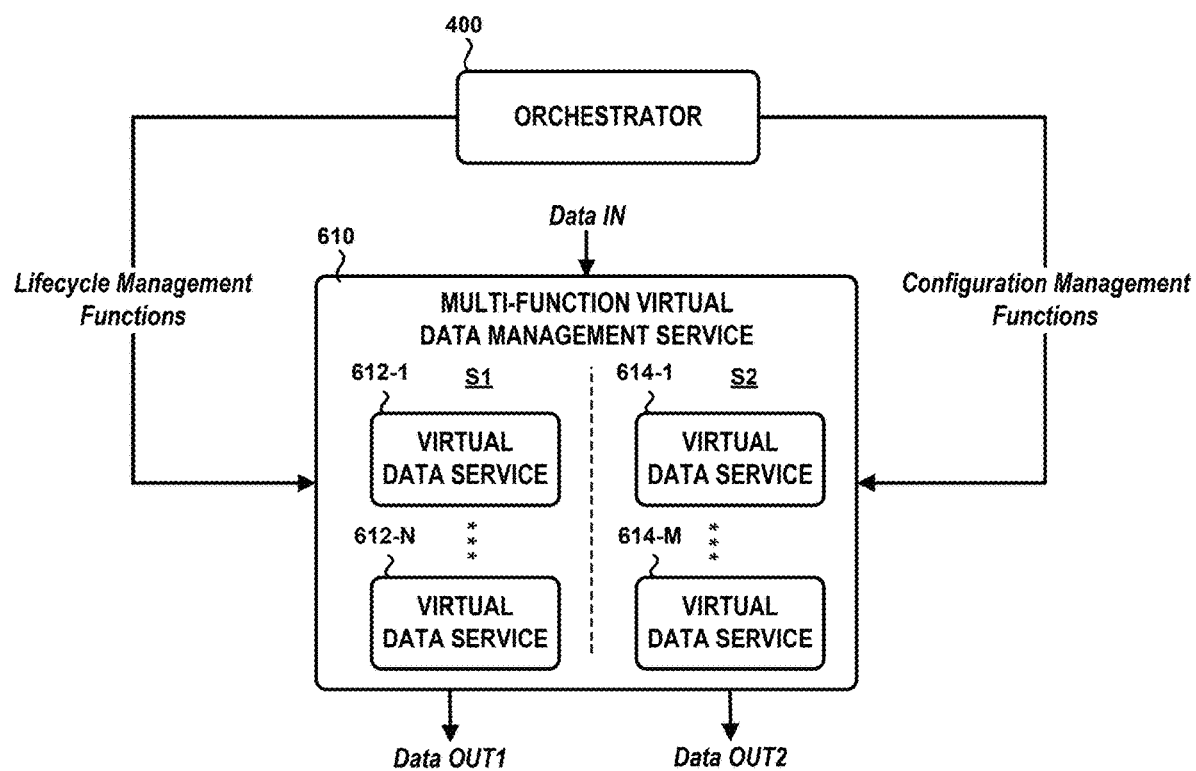
FIG. 6 schematically illustrates a method to manage and configure a multi-function virtual data management service by aggregating multiple instances of different virtual data service functions, according to another embodiment of the invention.

FIG. 6 schematically illustrates a method to manage and configure a multi-function virtual data management service by aggregating multiple instances of different virtual data service functions, according to another embodiment of the invention. In particular, FIG. 6 illustrates an exemplary embodiment in which the orchestrator module 400 instantiates and configures a multi-function virtual data management service 610 comprising two (or more) parallel sequences of data services, wherein the sequences of data services are executed independently. In particular, as shown in the example embodiment of FIG. 6, the multi-function virtual data management service 610 comprises a first sequence S1 of N virtual data services 612-1, . . . , 612-N, and a second sequence S2 of M virtual data services 614-1, . . . , 614-M, which operate on the same input data stream (Data IN), and which are executed independently (e.g., executed in parallel, concurrently, etc.). For instance, the first sequence S1 of N virtual data services may include a composed sequence of two virtual data services including a deduplication service to perform a data deduplication process on an input data stream Data IN, and a block storage service to store the deduplicated data stream (Data OUT1) in a block storage array. The second sequence S2 of M virtual data services may include a composed sequence of three virtual data services including, for example, a data backup service, followed by a data deduplication service, and followed by a block storage service to store the deduplicated data stream (Data OUT2) in a block storage array.

Figure 7:
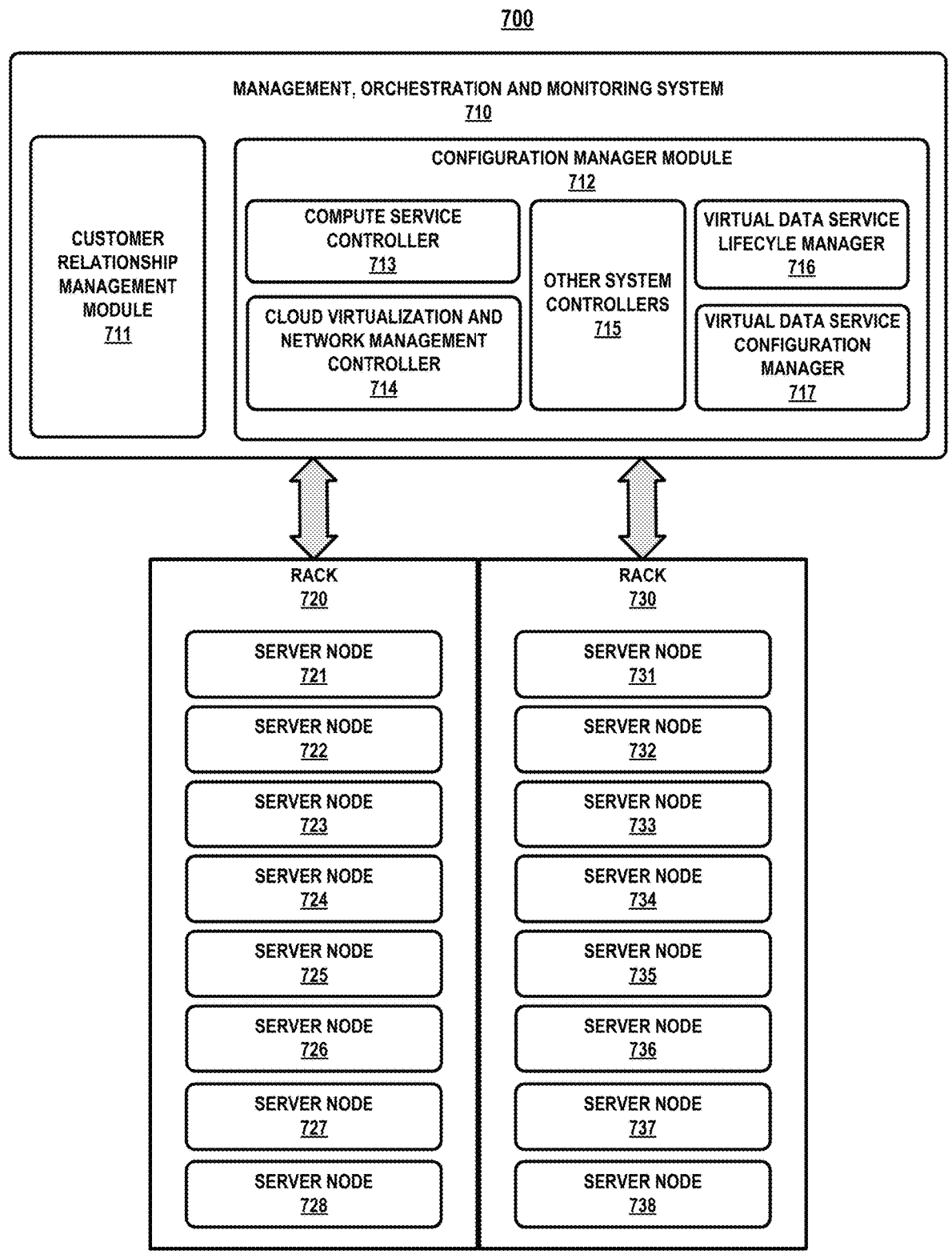
FIG. 7 schematically illustrates a converged infrastructure platform which implements a virtualization system to provide virtual data management services, according to an embodiment of the invention.

FIG. 7 schematically illustrates a converged infrastructure platform which implements a virtualization system to provide virtual data management services, according to an embodiment of the invention. The converged infrastructure platform 700 comprises a management, orchestration and monitoring system 710, and a plurality of rack systems 720 and 730. A first rack system 720 comprises a plurality of server nodes 721, 722, 723, 724, 725, 726, 727, and 728 (e.g., rack-mounted servers), and a second rack system 730 comprises a plurality of server nodes 731, 732, 733, 734, 735, 736, 737, and 738 (e.g., rack-mounted servers). The rack systems 720 and 730 include other components such as top-of-rack switches, spine switches, system controllers, power distribution units, etc., which are not specifically shown in FIG. 7.

In one embodiment, the converged infrastructure platform 700 is implemented using the VxRack FLEX rack-scale hyper-converged system by Dell EMC. The VxRack FLEX system is a heterogeneous rack-scale HCI system that is configured to provide a pool of compute/network/storage resources that can be used across many stacks. The VxRack FLEX system is configured to support multiple hypervisors, multiple physical operating systems, bare-metal applications, and container use cases, simultaneously.

The management, orchestration and monitoring system 710 comprises a customer relationship management (CRM) module 711, and a configuration manager module 712. The configuration manager module 712 comprises a compute service controller 713, a cloud virtualization and network management controller 714, other system controllers 715, a virtual data service lifecycle manager 716, and a virtual data service configuration manager 717. The management, orchestration and monitoring system 710 illustrates an embodiment in which a virtual data services M&O system (e.g., managers 716 and 717) is integrated with OSS/BSS components within the management, orchestration and monitoring system 710 to provide additional support for the configuration, instantiation, and deployment of virtual data management services as discussed herein.

The CRM module 711 comprises a software module that is configured for managing business processes related to customer data and customer interaction. The CRM module 711 manages and analyzes customer interactions and data throughout the customer lifecycle. The controllers 713, 714 and 715 can be implemented using any suitable open-source software configuration management tool such as Puppet and OpenStack. OpenStack is an open source software that allows for the deployment and management of a cloud infrastructure-as-a-service (IaaS) platform. OpenStack supports both private and public cloud deployments. OpenStack supports different hypervisors (such as Xen, VMware or kernel-based virtual machine (KVM) for instance) and several virtualization technologies (such as bare metal or high-performance computing). The compute service controller 713 serves as a system controller that provisions and manages virtual machines that execute on server nodes with the system racks 720 and 730. The cloud virtualization and network management controller 714 is configured to enable connectivity between virtual machines through virtual networks, and to launch and manage several cloud applications within the system 700.

Figure 8:
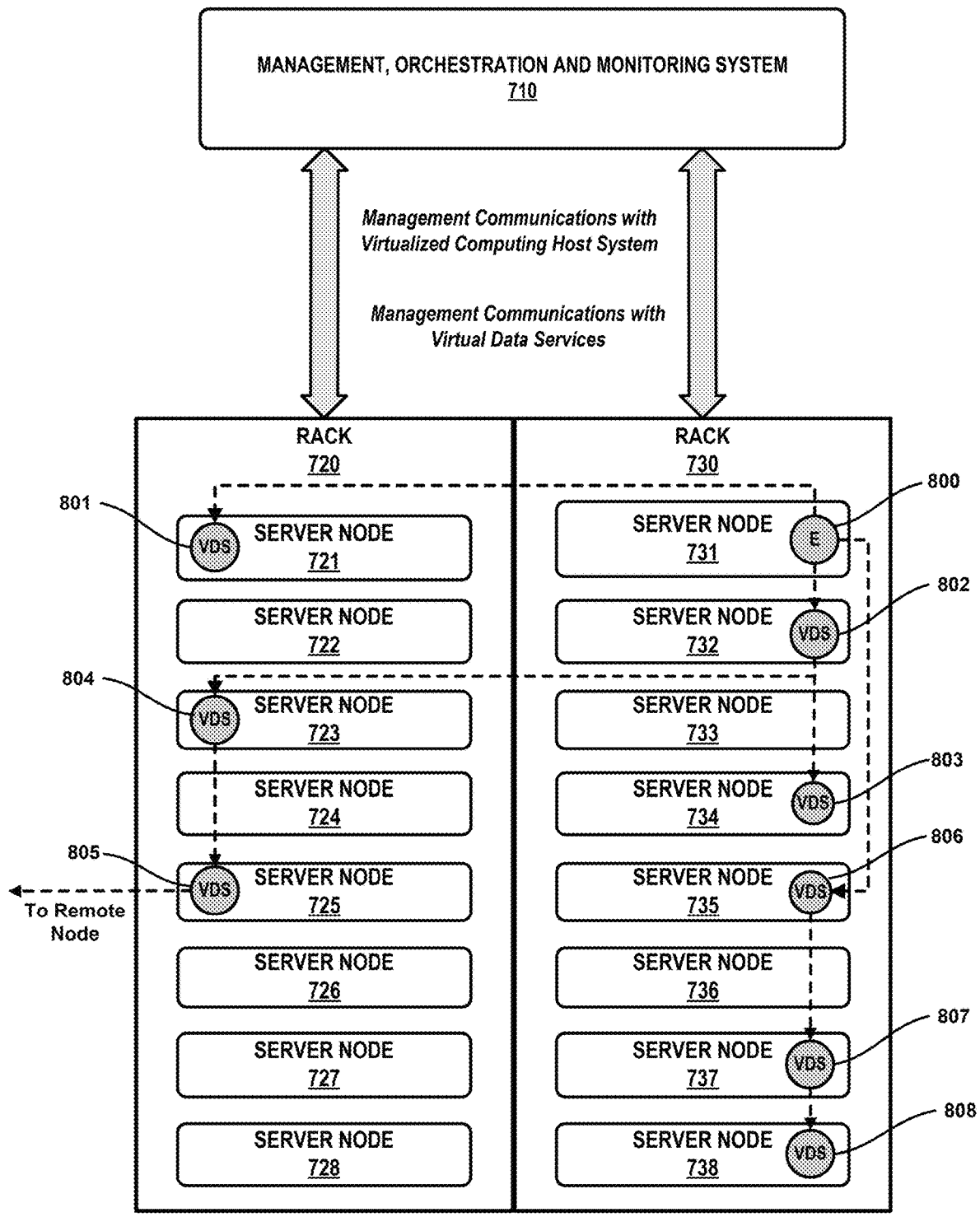
FIG. 8 schematically illustrates method for providing a virtual data management service by aggregating multiple instances of virtual data service functions across multiple server nodes of the converged infrastructure platform of FIG. 7, according to an embodiment of the invention.

The virtual data service lifecycle manager 716 and the virtual data service configuration manager 717 implement functions as discussed herein to instantiate and configure virtual data services across multiple server nodes within the rack systems 720 and/or 730 to provide virtual data management services, as illustrated in FIG. 8. In particular, FIG. 8 schematically illustrates a method for providing a virtual data management service by aggregating multiple instances of virtual data services across multiple server nodes of the converged infrastructure platform of FIG. 7, according to an embodiment of the invention. The management, orchestration, and monitoring system 710 instantiates, configures, and deploys a VDS execution engine 800 (e.g., virtual machine, container, bare metal etc.) on the server node 731 in the rack system 730, wherein the VDS execution engine 800 controls the execution of a plurality of virtual data service instances 801, 802, 803, 804, 805, 806, 807, and 808 which are configured and logically linked to provide a multi-function virtual data management service.

In the example embodiment shown in FIG. 8, the multi-function virtual data management service that is performed by the VDS execution engine 800 comprise multiple parallel virtual data service function chains, wherein the dashed lines represent the logical connections between the virtual data service instances. The virtual data service instances 801, 802, 803, 804, 805, 806, 807, and 808 are shown to execute on different sever nodes across the server rack systems 720 and 730, wherein the virtual data service instances 801, 802, 803, 804, 805, 806, 807, and 808 can be implemented using one or more of any combination of virtual machines, container applications, and/or bare metal applications.

For example, as shown in FIG. 8, the VDS execution engine 800 is configured to execute a VDS 801 on the server node 721 in the rack system 720, wherein the VDS 801 may comprise a block storage service which is utilized by the VDS execution engine 800 for a primary persistent store. In addition, the VDS execution engine 800 is configured to execute a VDS sequence comprising VDS 802 and VDS 803, which execute on respective server nodes 732 and 734. The VDS 802 may comprise a virtual file share service, and the VDS 803 may comprise a block storage service. Further, the VDS execution engine 800 is configured to execute a VDS sequence comprising VDS 802, VDS 804, and VDS 805. In this sequence, the virtual file share service (VDS 802) is further configured to use a virtual data replication service (VDS 804) and a virtual data service 805 to transport the data stream to a remote node. As further shown in FIG. 8, the VDS execution engine 800 is further configured to execute a VDS sequence comprising VDS 806, VDS 807, and VDS 808, which execute on respective server nodes 735, 737, and 738. This sequence may implement a backup service function chain that includes a data backup service (VDS 806), a data deduplication service (VDS 807), and a block storage service (VDS 808).

It is to be appreciated that there are many use cases for which xSPs could use data storage virtualization systems and methods as discussed herein. A sample of potential use cases is illustrated below, wherein it is assumed that the an xSP expands Service Offerings to include options for a variety of both diverse service deployments, as well as storage capabilities to complement those service offerings, as defined below.

(i) Deploy standard templates for business application hosting. The application (virtual machine, container, or bare metal) can be deployed using an xSP template that leverages automation capabilities for storage service deployment from the virtual data services M&O. There may be a variety of options or templates that include various QoS options that the customer can choose from. The QoS options align to virtual data service templates supported by the xSP, or virtual data service templates created by the customer, and apply to any of the use cases below.

(ii) Deploy custom options for application hosting. Rather than hand-crafting custom configurations for special tenant requests related to storage and data protection, the xSP can leverage M&O automation to deploy additional services for storage expansion, backup, replication, etc., via virtual data service template updates. The tenant-specific custom templates are pre-validated using the xSP and Virtual Data Service M&O functions to assess consistency with available resources. Creating custom options for tenants also applies to any of the use cases below.

(iii) Deploy standard and custom virtual desktop infrastructure (VDI) solutions from a service catalog. VDI is virtualization technology that hosts a desktop operating system on a centralized server in a data center. VDI is a variation on the client-server computing model, sometimes referred to as server-based computing.

(iv) Deploy standard and custom Database hosting services from the service catalog.

(v) Deploy standard and custom Web Hosting and eCommerce applications.

(vi) Deliver Infrastructure-as-a-Service (IaaS) capabilities to customers based on standard service catalog offerings, with on-demand options for additional storage, backup, and replication capabilities.

(vii) Deliver a Hosted Private Cloud, hosted on xSP premises, based on either standard or customized templates.

(viii) Deploy standard and custom Platform-as-a-Service (PaaS) templates on shared infrastructure.

(ix) Deploy standard and custom PaaS templates on tenant-only hardware. The "tenant-only hardware" option is an option for any of the use cases above, but should be viewed as an exception, and is very expensive, since the xSP would be committing entire servers to that tenant. This can be an option to create islands of service, but where shared services for that environment would be provided in the form of network switches and storage services, such that only servers would be single-tenant.

It should be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

We claim:

1. In a computing system comprising a cluster of server nodes, a method for providing virtual data management services, comprising:

receiving a request for a data management service;

provisioning one or more server nodes within the cluster of server nodes to execute the requested data management service;

configuring one or more instances of virtual data services from a plurality of available virtual data service templates to virtually compose the requested data management service, wherein the virtual data service templates comprise (i) software image templates that define virtual data services in a non-configured form and (ii)

chain templates which comprise defined sequences of software image templates of virtual data services; and executing the configured instances of virtual data services on the one or more provisioned server nodes to perform the requested data management service;

wherein one or more of the configured instances of virtual data services are configured to execute on virtual machines.

2. The method of claim 1, wherein one or more of the configured instances of virtual data services are configured to execute as operating system containers.

3. The method of claim 1, wherein one or more of the configured instances of virtual data services are configured to execute as bare metal applications.

4. The method of claim 1, wherein the data management service comprises one of a block storage service, an object storage service, a file storage service, and any combination of block object and file storage services.

5. The method of claim 1, wherein the image templates comprise predefined image templates provided by the computing system, custom-defined image templates defined by end-users, and a combination of predefined and custom image templates.

6. The method of claim 1, wherein configuring one or more instances of virtual data services comprises instantiating a multi-function data management service that is configured by aggregating instances of different virtual data services.

7. The method of claim 6, wherein the multi-function data management service comprises two or more virtual data services that are executed in a configured sequence.

8. The method of claim 6, wherein the multi-function data management service comprises two or more virtual data services that are executed independently.

9. The method of claim 6, wherein the multi-function data management service comprises two or more sequences of virtual data services, wherein the sequences of virtual data services are executed independently.

10. The method of claim 6, wherein the multi-function data management service comprises two or more different virtual data services, wherein the different virtual data services comprise two or more of a data storage service, a data replication service, a data mirroring service, a data archiving service, a data snapshot service, a data relocation service, a data encryption service, a data decryption service, and a data deduplication service.

11. The method of claim 1, wherein the provisioning and configuring steps are performed by a management and orchestration system in the computing system, which is configured to manage a plurality of different types of virtual data services under a common application programming interface.

12. An article of manufacture comprising a processor-readable storage medium having encoded therein executable code of one or more software programs, wherein the one or more software programs when executed by one or more processing devices implement a method for providing virtual data management services in a computing system comprising a cluster of server nodes, the method comprising:

receiving a request for a data management service;

provisioning one or more server nodes within the cluster of server nodes to execute the requested data management service;

configuring one or more instances of virtual data services from a plurality of available virtual data service templates to virtually compose the requested data management service, wherein the virtual data service templates comprise (i) software image templates that define virtual data services in a non-configured form and (ii) chain templates which comprise defined sequences of software image templates of virtual data services; and executing the configured instances of virtual data services on the one or more provisioned server nodes to perform the requested data management service;

wherein one or more of the configured instances of virtual data services are configured to execute on virtual machines.

13. A computing system comprising:

a cluster of server nodes; and a management and orchestration system which is configured to:

receive a request for a data management service;

provision one or more server nodes within the cluster of server nodes to execute the requested data management service;

configure one or more instances of virtual data services from a plurality of available virtual data service templates to virtually compose the requested data management service, wherein the virtual data service templates comprise (i) software image templates that define virtual data services in a non-configured form and (ii) chain templates which comprise defined sequences of software image templates of virtual data services; and execute the configured instances of virtual data services on the one or more provisioned server nodes to perform the requested data management service;

wherein one or more of the configured instances of virtual data services are configured to execute on virtual machines.

14. The system of claim 13, wherein one or more of the configured instances of virtual data services are configured to execute as operating system containers.

15. The system of claim 13, wherein one or more of the configured instances of virtual data services are configured to execute as bare metal applications.

16. The system of claim 13, wherein the image templates comprise predefined image templates provided by the management and orchestration system, custom-defined image templates defined by end-users, and a combination of predefined and custom image templates.

17. The system of claim 13, wherein virtual data management service comprises a multi-function data management service that is configured by aggregating multiple instances of different virtual data services, wherein the multi-function data management service comprises two or more different virtual data services, wherein the different virtual data services comprise two or more of a data storage service, a data replication service, a data mirroring service, a data archiving service, a data snapshot service, a data relocation service, a data encryption service, a data decryption service, and a data deduplication service.

18. The system of claim 17, wherein the multi-function data management service comprises one of (i) two or more virtual data services that are executed in a configured sequence, (ii) two or more virtual data services that are executed independently and (iii) two or more sequences of data services, wherein the sequences of data services are executed independently.

19. The method of claim 1, wherein the image templates comprise software image templates that define virtual data services in a pre-configured form.

20. The system of claim 13, wherein the image templates comprise software image templates that define virtual data services in a pre-configured form.

* * * * *